(12) United States Patent
Kia et al.

(10) Patent No.: US 10,836,875 B2
(45) Date of Patent: Nov. 17, 2020

(54) LIGHTWEIGHT FIBER-REINFORCED POLYMER SANDWICH STRUCTURES

(71) Applicant: GM Global Technology Operations LLC, Detroit, MI (US)

(72) Inventors: Hamid G. Kia, Bloomfield Hills, MI (US); Selina X. Zhao, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 186 days.

(21) Appl. No.: 15/916,890

(22) Filed: Mar. 9, 2018

(65) Prior Publication Data

US 2019/0276616 A1  Sep. 12, 2019

(51) Int. Cl.
| | | |
|---|---|---|
| C08J 5/04 | (2006.01) | |
| C08K 3/40 | (2006.01) | |
| B29C 70/02 | (2006.01) | |
| C08K 3/04 | (2006.01) | |
| B29C 70/70 | (2006.01) | |
| B29D 99/00 | (2010.01) | |
| B29C 70/16 | (2006.01) | |

(52) U.S. Cl.
CPC .............. C08J 5/043 (2013.01); B29C 70/023 (2013.01); B29C 70/025 (2013.01); B29C 70/16 (2013.01); B29C 70/70 (2013.01); B29D 99/0089 (2013.01); C08J 5/042 (2013.01); C08K 3/04 (2013.01); C08K 3/40 (2013.01); C08J 2300/22 (2013.01); C08J 2300/24 (2013.01)

(58) Field of Classification Search
CPC ........ C08J 5/043; C08J 5/042; C08J 2300/22; C08J 2300/24; B29C 70/023; B29C 70/025; B29C 70/16; B29C 70/70; B29D 99/0089; C08K 3/04; C08K 3/40
USPC .......................................................... 524/494
See application file for complete search history.

(56) References Cited

U.S. PATENT DOCUMENTS

| | | | |
|---|---|---|---|
| 3,769,126 A | * | 10/1973 | Kolek .................. B29B 15/125 |
| | | | 156/172 |
| 4,497,788 A | | 2/1985 | Bradley et al. |
| 5,024,818 A | | 6/1991 | Tibbetts et al. |
| 5,089,206 A | | 2/1992 | Kia |
| 5,225,135 A | | 7/1993 | Kia |

(Continued)

*Primary Examiner* — Ronald Grinsted
(74) *Attorney, Agent, or Firm* — Quinn IP Law

(57) ABSTRACT

Presented are fiber-reinforced polymer (FRP) sandwich structures, methods for making/using such FRP sandwich structures, and motor vehicles with a vehicle component fabricated from a compression molded thermoset or thermoplastic FRP sandwich structure. A multidimensional composite sandwich structure includes first and second (skin) layers formed from a thermoset of thermoplastic polymer matrix, such as resin or nylon, filled with a fiber reinforcing material, such as chopped carbon fibers. A third (core) layer, which is encased between the first and second skin layers, is formed from a thermoset/thermoplastic polymer matrix filled with a fiber reinforcing material and a filler material, such as hollow glass microspheres. The first, second and third layers have respective rheological flow properties that are substantially similar such that all three layers flow in unison at a predetermined compression molding pressure. These layers may be formed from the same thermoset/thermoplastic polymer material, and include the same fiber reinforcing material.

20 Claims, 1 Drawing Sheet

(56) References Cited

U.S. PATENT DOCUMENTS

| | | |
|---|---|---|
| 7,819,462 B1 | 10/2010 | Owens |
| 8,033,592 B2 | 10/2011 | Hsu et al. |
| 8,109,492 B2 | 2/2012 | Winocur |
| 8,309,644 B1 | 11/2012 | Huang |
| 8,481,170 B2 | 7/2013 | Vanimisetti et al. |
| 8,961,724 B2 | 2/2015 | Polewarczyk et al. |
| 9,227,673 B2 | 1/2016 | Berger et al. |
| 9,328,266 B2 | 5/2016 | Vanimisetti et al. |
| 9,399,490 B2 | 7/2016 | Aitharaju et al. |
| 9,650,003 B2 | 5/2017 | Owens et al. |
| 2011/0247958 A1* | 10/2011 | Lucas .................. B29C 70/521 206/524.6 |
| 2012/0213997 A1 | 8/2012 | Wang et al. |
| 2018/0029316 A1 | 2/2018 | Coppola et al. |
| 2018/0030922 A1 | 2/2018 | Kia et al. |
| 2018/0030923 A1 | 2/2018 | Coppola et al. |
| 2018/0030924 A1 | 2/2018 | Coppola et al. |
| 2018/0031027 A1 | 2/2018 | Coppola et al. |

* cited by examiner

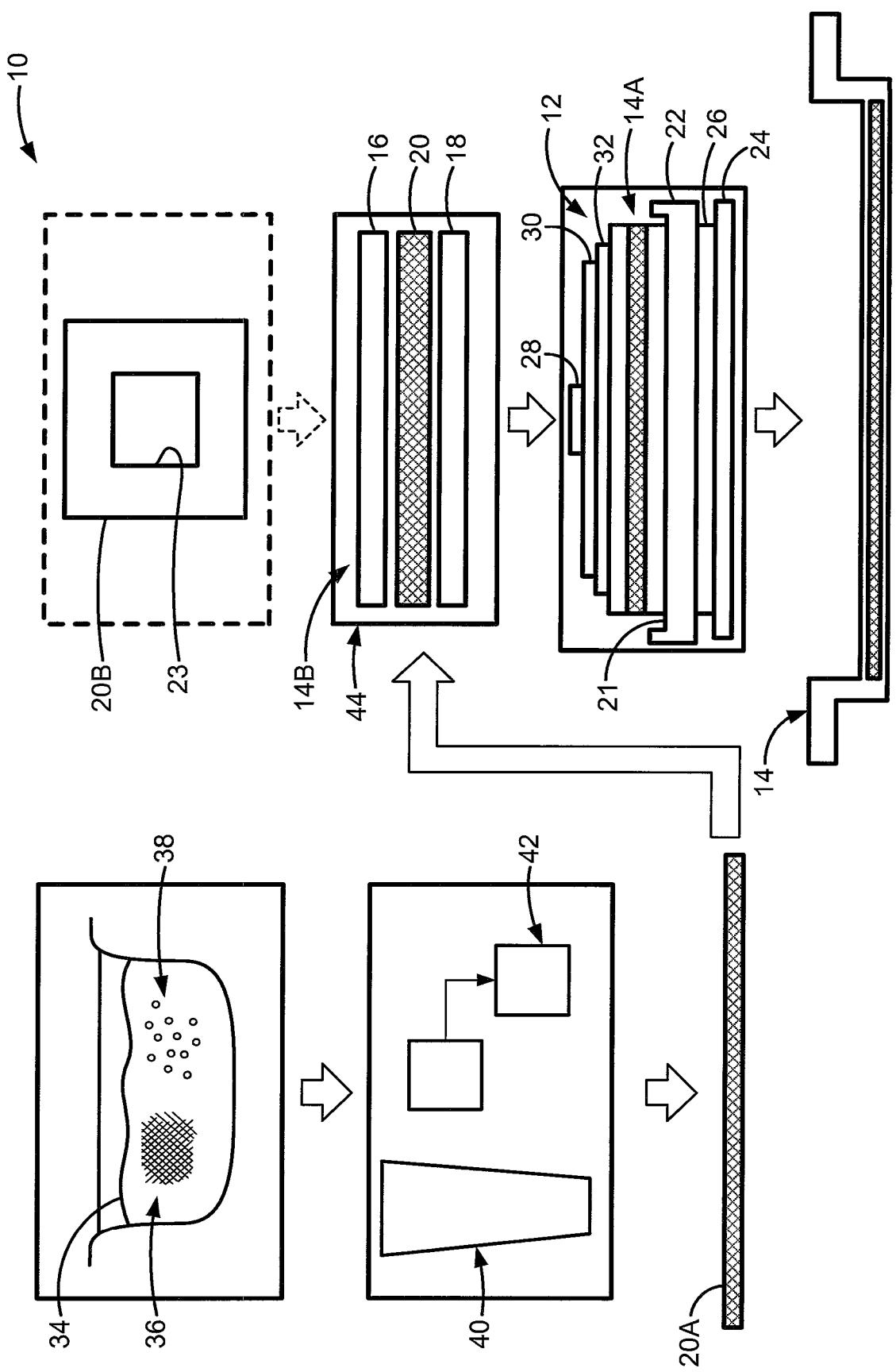

LIGHTWEIGHT FIBER-REINFORCED POLYMER SANDWICH STRUCTURES

INTRODUCTION

The present disclosure relates generally to the manufacture of composite-material sandwich structures. More specifically, aspects of this disclosure relate to compression molded fiber-reinforced polymer sandwich structures, as well as systems, methods, and devices for constructing fiber-reinforced polymer sandwich structures.

Composite materials are used for manufacturing a vast array of modern products. Many current-production automobiles, watercraft, and aircraft, for example, are assembled with load-bearing body panels, aesthetic trim panels, support frame members, as well as various other components that are manufactured, in whole or in part, from composite materials. Fiber-reinforced plastic (FRP) is an example composite material that is used in mass-production manufacturing applications, favored for its high strength-to-weight ratio, increased elasticity, corrosion resistance, and light weight properties. FRP's are typically formed by suspending a high-tensile-strength fibrous material, such as glass, carbon, aramid, or basalt fibers, within a solidified polymer, such as a thermoset epoxy-resin matrix or a thermoplastic polyester or nylon.

There are many available techniques for mass producing thermoset and thermoplastic FRP composite constructions, an example of which includes compression molding. Compression molding is a high-volume, high-pressure manufacturing process in which the base materials are placed in an open mold cavity of a pneumatic or hydraulic molding press. Pre-heating or in situ heat is applied to bring the base materials to a plasticized or otherwise pliable state. A top plug then closes the open face of the mold; the mating mold parts are clamped together in order to compress the base materials between the plug and mold. In-mold pressure is drastically increased, e.g., to 2000-4000 pounds per square inch (psi), in order to force the base materials to fill the interior mold cavity. Mold heat and pressure are maintained while the constituent thermoset/thermoplastic materials are cured. After cure, the part may be demolded manually, robotically, or by ejector pins integral with the molding press.

SUMMARY

Disclosed herein are lightweight fiber-reinforced polymer sandwich structures, methods for making and methods for using such FRP sandwich structures, and motor vehicles equipped with one or more vehicle components each fabricated from a compression molded thermoset or thermoplastic FRP sandwich structure. By way of example, there is presented a lightweight FRP sandwich structure with a glass-microsphere-filled thermoset epoxy core sheet that is encased between perforated epoxy-impregnated carbon-fiber sheet ("prepreg"), e.g., with a [0/90/90/0] fiber orientation, and compression molded to a desired component geometry. In this example, a [0/90/90/0] prepreg frame sheet may be inserted between the two outer prepreg layers, and fabricated with a window that seats therein the thermoset epoxy core sheet. Also presented herein is a lightweight FRP sandwich structure with a glass-microsphere-filled carbon fiber reinforced thermoplastic polymer (CFRTP) core sheet that is encased between CFRTP skin layers and compression molded to a desired component geometry. In this example, the core sheet may be extruded from a combination of virgin and recycled CFRTP materials. For either of the foregoing FRP sandwich structures, the glass-microsphere filler may be supplemented with or substituted by wood particles, flakes of clay, calcium carbonate fragments, or any other suitable filler material. As another option, the outer skin layers may replace or supplement the carbon reinforcing fibers with glass fiber, aramid fiber, basalt fiber, or any other suitable fiber material.

Attendant benefits for at least some of the disclosed concepts include low-mass, high-strength FRP sandwich structures that can be compression molded without destructing or delaminating the middle core layer. The perforated carbon-fiber prepreg layers provide rheological flowability under compression molding forces. The core layer may be partially cured prior to compression molding to match the rheological properties of the prepreg layers. In addition, using recycled CFRTP in combination with hollow microspheres help to create a flowable core. The comparable rheologic properties of the core and skin layers allow the sandwich structure to flow in unison under compression molding. Other attendant benefits may include increased strength, decreased mass, lower part cost, reduced production costs, and improved fuel economy, e.g., for motor vehicle applications, when compared to conventional counterpart FRP sandwich structures.

Aspects of the present disclosure are directed to lightweight fiber-reinforced polymer sandwich structures. For instance, a multidimensional FRP composite sandwich structure is presented that includes (or consists essentially of) first and second (outer-most skin) layers with a third (central core) layer, which is encased between or otherwise sandwiched by the first and second layers. The first layer is formed from a first thermoset or thermoplastic polymer matrix that embeds therein a first fiber-based reinforcing material. Likewise, the second layer is formed from a second thermoset or thermoplastic polymer matrix that embeds therein a second fiber-based reinforcing material. For at least some applications, the first and second layers are fabricated from the same polymer material that is embedded with the same reinforcing fiber. The third layer is formed from a third polymer matrix, such as a thermoplastic nylon or a thermoset epoxy resin. A third fiber-based reinforcing material, such as chopped carbon fibers or a carbon fiber sheet, is embedded within the third polymer matrix, and a filler material, such as hollow glass microspheres, is interspersed within the third polymer matrix. The first, second and third layers have respective rheological flow properties that are substantially similar such that all three layers flow in unison under the force of a predetermined compression molding pressure.

Other aspects of the present disclosure are directed to motor vehicles equipped with a vehicle component, such as a battery pack support tray, floor pan, or exterior body panel, that is fabricated from a compression molded FRP sandwich structure. As used herein, the term "motor vehicle" may include any relevant vehicle platform, such as passenger vehicles (internal combustion engine, hybrid, full electric, fuel cell, fully or partially autonomous, etc.), commercial vehicles, industrial vehicles, tracked vehicles, off-road and all-terrain vehicles (ATV), farm equipment, boats, airplanes, etc. As an example, a motor vehicle is presented that includes a vehicle body with a rigid frame, e.g., fabricated as a unibody, body-on-frame, or other vehicle chassis construction. A vehicle component, which is fabricated, in whole or in part, from a FRP sandwich structure, is mounted to the rigid frame. In this example, the FRP sandwich structure includes a pair of (outer) skin layers, each of which is formed from a thermoset or thermoplastic polymer matrix that is embedded with a fiber reinforcing material. A core layer, which is disposed between and attached to the two skin layers, is formed from the same thermoset or thermoplastic polymer matrix as the skin layers, and may be embedded with the same fiber reinforcing material as the skin layers. A suitable FRP filler material is interspersed within the thermoset/thermoplastic polymer matrix of the core layer. The skin layers and the core layer have similar rheological flow properties that allow the three layers to generally flow in unison during compression molding (e.g., at a calibrated molding temperature and pressure).

Additional aspects of this disclosure are directed to methods for making and methods for using high-strength, low-mass FRP sandwich structures. In an example, a method is presented for forming a multidimensional composite sandwich structure. This representative method includes, in any order and in any combination with any of the above or below disclosed features and options: forming a first layer from a first polymer matrix including a first fiber reinforcing material embedded within the first polymer matrix; forming a second layer from a second polymer matrix including a second fiber reinforcing material embedded within the second polymer matrix; forming a third layer from a third polymer matrix, the third layer including a third fiber reinforcing material embedded within the third polymer matrix, and a filler material interspersed within the third polymer matrix; positioning the third layer between the first and second layers; and compression molding the first, second and third layers into a curved, stepped or otherwise shaped multidimensional composite sandwich structure. The first, second and third layers have first, second and third rheological flow properties, respectively, that are substantially similar such that the first, second and third layers generally flow in unison at a predetermined compression molding pressure and/or temperature.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWING

FIG. 1 is a workflow diagram schematically illustrating a representative compression molding system and process for manufacturing a multidimensional thermoplastic or thermoset fiber-reinforced polymer sandwich structure in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawing. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example.

Referring now to the drawings, wherein like reference numbers refer to like features, there is shown in FIG. 1 a representative controller-automated compression molding system, designated generally at 10, for manufacturing lightweight, high-strength fiber-reinforced plastic (FRP) sandwich structures. The illustrated compression molding manufacturing system 10—also referred to herein as "manufacturing system" or "compression molding system"—is merely an exemplary application with which novel aspects and features of this disclosure may be practiced. In the same vein, implementation of the present concepts for fabricating motor vehicle components should also be appreciated as a representative application of the novel aspects and features disclosed herein. As such, it will be understood that aspects and features of this disclosure may be implemented for manufacturing other FRP-based products, and may be integrated into any logically relevant type of compression molding architecture. Moreover, only select components of the manufacturing system 10 have been shown by way of example in the drawings and will be described in detail herein. Nevertheless, the manufacturing system 10 of FIG. 1 can include numerous additional and alternative features, as well as other available and hereinafter developed peripheral components, without departing from the intended scope of this disclosure. Lastly, the features presented in FIG. 1 are not necessarily to scale and are provided purely for instructional purposes. Thus, the specific and relative dimensions shown in the FIG. 1 are not to be construed as limiting.

Compression molding manufacturing system 10 of FIG. 1 employs a representative high-flow compression molding press 12 for fabricating any of a variety of thermoplastic or thermoset FRP sandwich structures 14 generally composed of at least three layers: a first (outer skin) layer 16, a second (outer skin) layer 18, and a third (central core) layer 20 interposed between the first and second layers 16, 18. In accord with the illustrated example, the first, second and third layers 16, 18, 20 span substantially the entirety of, and thus, are coextensive with one another. Moreover, the first and second layers 16, 18 are shown attached directly to respective opposing surfaces of the third layer 20. While portrayed as a tripartite construction, it is contemplated that the FRP sandwich structure 14 comprise more than the three layers 16, 18, 20 presented in FIG. 1. For instance, the FRP sandwich structures 14 may comprise one or more adhesive layers, additional reinforcement layers, and/or optional laminate layers or surface coatings (e.g., corrosion-resistant sprays, aluminum plating, paints, reinforced cellulosic materials, or any combination thereof). In contrast, it is contemplated that the FRP sandwich structure 14 consist essentially or solely of the three illustrated layers 16, 18, 20 and, thus, include only two FRP outer skin layers that sandwich therebetween a single fiber-reinforced and filler-modified thermoset or thermoplastic polymer core. As used herein, the term "layer" is inclusive of, but does not necessarily require a particular segment of a composite construction span the entirety of (i.e., be coextensive with) all remaining layers.

With continuing reference to the representative architecture of FIG. 1, the compression molding press 12 includes a lower mold half (or "tool") 22 defining a recessed mold cavity 21 into which a pre-heated sandwich stack-up 14A is introduced. A press bed 24 carries a lower mold heating plate 26 which supports on its upper surface the lower mold half 22. Juxtaposed with the mold tool 22 is a hydraulic or pneumatically actuated ram 28 that carries on its lower surface an upper mold heating plate 30 which supports an upper mold half (or "die") 32. During operation of the compression molding press 12, the lower and upper mold halves 22, 32 are preheated via their respective heating plates 26, 30 prior to or contemporaneous with introduction of the sandwich stack-up 14A. The upper mold half 32 is then transitioned downward into mating engagement with the lower mold half 22 via controller-regulated movement of the ram 28. After clamping or otherwise sealing the mold tool 22 to the mold die 32, the sandwich stack-up 14A is subjected to heat and pressure inside the mold cavity 21, which results in concomitant flow rates of the melted or plasticized polymer-and-fiber mixtures of the layers 16, 18, 20 in the stack-up 14A. Compression and heating of the sandwich stack-up 14A within the compression molding press 12 causes the flowable resin/fiber mixtures to flow through all segments of the internal mold cavity 21. Temperature and pressure is maintained in the mold cavity 21 until the melted thermoplastic/thermoset polymer crystallizes or otherwise cures and becomes fully consolidated. Cooling of the mold tool 22 and/or die 32 may be performed using the application of compressed gas, cooling fluid, or other available techniques.

In order to create the sandwich stack-up 14A used to form the final FRP sandwich structures 14, a metered quantity of thermoplastic or thermoset polymer matrix 34 may be mixed with a premeasured quantity of chopped fibers or impregnated into a fiber rove or mat (colloquially referred to as a "prepreg"), the fibers and prepreg being collectively represented as fiber reinforcing material 36 in FIG. 1. A filler material 38, such as hollow microspheres (or "micro-balloons") made from a variety of glass, ceramics, or other carbon materials in the range of from about 10 to about 100 microns in diameter, is interspersed throughout the thermoplastic or thermoset polymer matrix 34. To form a core sheet 20A, a mixture of polymer 34 and filler material 38 may be passed through an extruder 40, e.g., in a thermoplastic FRP sandwich structure application. Alternatively, a mixture of polymer 34, fiber reinforcing material 36 and filler material 38 may be passed through a prepreg casting and cutting line 42, e.g., in a thermoset resin FRP sandwich structure application, to form a core sheet 20A. For at least some implementations, the third layer 20 may consist essentially of the core sheet 20A or, optionally, may comprise the core sheet 20A inserted into a through-hole or window 23 of a complementary frame sheet 20B.

Third layer 20—whether it be the core sheet 20A alone or the core sheet 20A in combination with the frame sheet 20B—is inserted between the first and second layers 16 and 18 to form an unheated sandwich stack-up 14B. This unheated sandwich stack-up 14B is then placed into an oven 44 and heated to a softening temperature to form the pre-heated sandwich stack-up 14A that is subsequently fed into the molding press 12 for compression molding. The thermoset or thermoplastic elements of the core layer 20 may be compatible with the thermoset or thermoplastic of the skin layers 16, 18 so that they coalesce and a strong bond is formed therebetween. For optional or alternative configurations, each skin layer 16, 18 may be adhered to their respective surface of the core layer 20 prior to initiation of the final thermo-compression molding process. A vacuum may be applied to the outer surface of the first and/or second skin layer 16, 18 sufficient to prevent debossing during stack cooling and to help improve outer surface appearance of outer skin layers 16, 18.

According to the illustrated example, the FRP sandwich structure 14 of FIG. 1 is compression molded into a curved, stepped, or otherwise non-planar, multidimensional part, such as a battery pack support tray for a rechargeable lithium-ion traction battery pack of an electric drive automobile. As indicated above, the FRP sandwich structure 14 may take on the form of a tripartite, unitary construction with a third (core) layer 20 that is disposed between first and second (outer skin) layers 16, 18. The first layer 16 is a fiber-reinforced polymer composition formed from a first polymer matrix that is embedded with a first fiber-based reinforcing material. In the same vein, the second layer 18 is a fiber-reinforced polymer composition formed from a second polymer matrix that is embedded with a second fiber-based reinforcing material. While the first and second layers 16, 18 may be structurally distinct, it may be desirable, for at least some implementations, that these two layers 16, 18 be substantially identical in shape, size and/or composition. By way of non-limiting example, both outer skin layers 16, 18 may be fabricated from a fiber rove or mat that is pre-impregnated with a thermoset resin matrix. The thermoset resin composition may be an unsaturated polyester resin, castable nylon resin, a vinyl ester resin, or any other suitable bulk molding compound (BMC).

This fiber rove/mat may take on the form of a perforated unidirectional or bidirectional [0/90/90/0] carbon fiber prepreg with approximately 30% to 50% content by weight or, in a more specific example, approximately 40% content by weight of a thermoset resin matrix. Characteristics of these perforations, including their size, shape, distribution pattern, and/or density (number of perforations per unit area) may be varied to achieve a desired functionality. In a representative and non-limiting configuration, the perforations may have an average width or diameter of approximately 10 to 100 microns, with an average density of approximately 100-1000 perforations per square meter. A desirable perforation concentration may be achieved with a weight percent (wt %) of about 90±2 wt % of embedded fibers that are about 85±2 mm long and a weight percent of about 10±2 wt % of embedded fibers that are about 10±2 mm long. While some applications may benefit from the use of a carbon-fiber based reinforcing material, the prepreg may be fabricated from a high-tensile-strength glass fiber, graphite fiber, aramid fiber, basalt fiber, or a combination thereof. The prepreg may be formed from several plies of fiber, e.g., with different, but specifically designed, fiber orientations, that are assembled into a multi-ply assembly. Optionally, several multi-ply assemblies may be stacked to compose a layup with a specific orientation of fibers to bolster the structural integrity of the part under construction.

Continuing with the above examples, the outer skin layers 16, 18 may be fabricated from a nylon resin or other thermoplastic polymer that is embedded with approximately 25% to 45% or, for at least some embodiments, approximately 35% by volume of continuous-length or discontinuous-length reinforcing fibers. In a more specific example, the thermoplastic polymer is a single-monomer nylon in the form of a semi-crystalline polyamide polymerized from heated caprolactam. Embedded reinforcing fiber materials may comprise coated or uncoated chopped carbon fibers with an average length of about 0.5 inches to 1.5 inches. Alternatively, the reinforcing fibers may be any of a variety of high strength fibers, such as, without limitation, glass, metal, and/or ceramic fibers or any of the other fibrous materials discussed herein. It is also envisioned that the fiber reinforcing material used in each layer or all of the layers be of similar or differing sizes and of similar or differing materials. Short fibers on the order of about 0.03 inches to 0.05 inches may be utilized for certain applications, whereas long fibers on the order of at least 0.5 inch in length, and extending up to about 2.0 inches and greater lengths, may be provided as appropriate for the compression molding operation. Likewise, the thermoplastic resin matrix may take on other available forms, including a polyphenylene sulfide (PPS), a polyether ether ketone (PEEK), a polyether imide (PEI), a polyether ketone ketone (PEKK), a polyether sulfone (PES), and/or a polyether ketone ketone-fc (PEKK-FC), to name a few examples. Fillers, additives and/or modifiers may be incorporated into any layer, as desired, to achieve specific mechanical properties, anisotropic or isotropic behaviors, dimensional stability, etc.

Sandwiched between and rigidly bonded to the outer skin layers 16, 18 is a FRP core layer 20 formed from a third polymer matrix that is embedded with a third fiber reinforcing material and at least partially filled with a filler material interspersed throughout the third polymer matrix. While the core layer 20 may be structurally distinct from the outer skin layers 16, 18, it may be desirable, for at least some implementations, that the polymer composition and fiber-based reinforcing material of the core layer 20 be substantially identical to those of the outer skin layers 16, 18. In a thermoset polymer application, for example, the core layer 20 (e.g., frame sheet 20B) may include a perforated unidirectional or bidirectional [0/90/90/0] carbon fiber prepreg with approximately 30-50% content by weight of a thermoset resin matrix. Conversely, in a thermoplastic polymer application, the core layer 20 (e.g., frame sheet 20B) may include a nylon resin that is embedded with approximately 25-45% by volume of chopped carbon fibers. In this regard, any of the features, options and alternatives described above with respect to the outer skin layers 16, 18 may be similarly applicable to the core layer 20. By way of non-limiting example, the polymer matrix used for forming the core layer 20 may include a thermoplastic nylon in the form of a semi-crystalline polyamide polymerized from caprolactam. As another option, the third polymer matrix may include organic bisphenol A diglycidyl ether (BADGE) liquid epoxy resin that is a reaction product of epichlorohydrin and bisphenol A, with an optional methyltetrahydrophthalic anhydride (MTPHA) curing agent supplemented with an optional silicone-free, polymer-based air release additive. The core layer's 20 polymer matrix material may comprise a mixture of the foregoing constituent parts with a ratio of 100:85:1 (resin:agent:additive). Filler material for the core sheet 20A may consist essentially of interspersed hollow glass microspheres e.g., at approximately 50% by volume with approximately 20 μm size and approximately 0.46 g/cc. For at least some embodiments, the filler material may include solid or hollow glass microspheres, wood particles, flakes of clay, calcium carbonate fragments, or any combination thereof. As indicated above, the core layer 20 may employ a complementary frame sheet 20B that is formed from a similar FRP composition as the corresponding skin layers 16, 18, and fabricated with a through-hole or window 23 within which is nested a core sheet 20A. After thoroughly mixing and casting the above materials, but prior to molding, the core sheet 20A may be brought to B-stage conditions, e.g., via oven heating at about 100° C. for about 25 minutes to achieve approximately 700 PaS to 1000 PaS viscosity range, and quenched in a freezer prior to placement between the skin layers and compression molding, e.g., at about 50 tons (1000 psi).

In a thermoplastic FRP sandwich structure application, the core layer 20 may comprise a combination of virgin thermoplastic polymer materials and recyclate CFRTP materials supplemented with a suitable filler material. For instance, the core sheet 20A may be formed from approximately 30% recyclate CFRTP and approximately 20% virgin polymer (e.g., nylon 6), with 50% by volume hollow glass microspheres. The recycled CFRTP composition may have short chopped carbon fibers (e.g., around 1 or 2 mm). After extrusion and casting, the charge may be heated to approximately 250° C., then placed into a mold with an internal temperature of approximately 150° C. The stack-up is then compression molded at about 2000 psi force, and thereafter held in the mold for approximately 30-45 second before removal.

To help ensure the resultant FRP sandwich structures 14 will properly mold without destructing or delaminating the core layer 20, the chemical and structural compositions of the core layer 20 are cooperatively formulated to match the overall rheological characteristics of the adjoining skin layers 16, 18 such that the multiple layers of the sandwich stack-up 14A generally flow in unison with one another. In particular, the first, second and third layers 16, 18, 20 have been fabricated to help ensure that their respective rheological flow properties are substantially similar such that the layers 16, 18, 20 of the sandwich stack-up 14A flow in unison when experiencing a predetermined compression molding pressure and/or temperature, examples of which are provided above. These rheological properties may comprise, singly or in combination, a respective softening point, ductility, viscosity, and dynamic shear rheometer (DSR), as some non-limiting examples. The core layer's 20 rheological response (viscosity) should be approximately the same as the skin layers 16, 18 in order for the sandwich stack-up 14A layers to move in unison. In the thermoset examples provided above, a b-staged FRP core in combination with a pre-measured microsphere filler will have a viscosity that is generally equivalent to or slightly higher than the surrounding carbon fiber prepreg skins. In addition, these carbon fiber prepreg sheets may be perforated to make them flowable under compression molding conditions. In the same vein, incorporating a recycled-and-virgin polymer core sheet loaded with hollow microspheres in a carbon fiber sandwich charge will help to ensure the core layer will have a viscosity that is generally equivalent to or slightly higher than the viscosity of virgin CFRTP skin layers. These CFRTP skin layers may be made with chopped fibers sized to ensure the layer is flowable under compression molding conditions.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A multidimensional composite sandwich structure, comprising:
    a first layer formed from a first polymer matrix and including a first fiber reinforcing material embedded within the first polymer matrix;
    a second layer formed from a second polymer matrix and including a second fiber reinforcing material embedded within the second polymer matrix; and
    a third layer disposed between the first and second layers, the third layer formed from a third polymer matrix and including a third fiber reinforcing material embedded within the third polymer matrix, and a filler material interspersed within the third polymer matrix,
    wherein the first and second fiber reinforcing materials each includes a fiber sheet with a plurality of perforations having an average width or diameter of about 10 to 100 microns and an average density of about 100-1000 perforations per square meter of the fiber sheet, and wherein the filler material includes at least 50% by volume of hollow microspheres having an average diameter of about 10 to 100 microns.

2. The composite sandwich structure of claim 1, wherein the first and second polymer matrices each includes a thermoset resin matrix, and wherein the fiber sheets of the first and second fiber reinforcing materials are pre-impregnated with the thermoset resin matrix.

3. The composite sandwich structure of claim 2, wherein each of the fiber sheets is a perforated unidirectional prepreg with about 40% content by weight of the thermoset resin matrix.

4. The composite sandwich structure of claim 1, wherein the hollow microspheres are hollow glass microspheres, and the third polymer matrix includes approximately 0.46 g/cc of the hollow glass microspheres.

5. The composite sandwich structure of claim 1, wherein the third polymer matrix includes a liquid epoxy resin that is a reaction product of epichlorohydrin and bisphenol A with a methyltetrahydrophthalic anhydride curing agent.

6. The composite sandwich structure of claim 1, wherein the third layer further comprises a frame sheet formed from a fiber sheet pre-impregnated with a thermoset resin matrix, the frame sheet including a through-hole within which is nested the third polymer matrix with the embedded third fiber reinforcing material and the interspersed filler material.

7. The composite sandwich structure of claim 1, wherein the first and second fiber reinforcing materials each includes chopped fibers, and the first and second polymer matrices each includes a thermoplastic nylon with 35% by volume of the chopped fibers.

8. The composite sandwich structure of claim 7, wherein the thermoplastic nylon is a semi-crystalline polyamide polymerized from caprolactam, and the first and second fiber reinforcing materials each includes chopped carbon fiber.

9. The composite sandwich structure of claim 8, wherein the hollow microspheres are hollow glass microspheres, and the third polymer matrix includes approximately 0.46 g/cc of the hollow glass microspheres.

10. The composite sandwich structure of claim 9, wherein the third polymer matrix includes a thermoplastic nylon, and the thermoplastic nylon is a semi-crystalline polyamide polymerized from caprolactam.

11. The composite sandwich structure of claim 1, wherein the first, second and third fiber reinforcing materials each includes carbon fibers, glass fibers, aramid fibers, basalt fibers, or any combination thereof.

12. The composite sandwich structure of claim 1, wherein the first, second and third fiber polymer matrices each includes a thermoset polymer or a thermoplastic polymer.

13. The composite sandwich structure of claim 1, wherein the filler material further includes wood particles, flakes of clay, calcium carbonate fragments, or any combination thereof.

14. A method of forming a multidimensional composite sandwich structure of claim 1, the method comprising:
    forming a first layer from a first polymer matrix including a first fiber reinforcing material embedded within the first polymer matrix;
    forming a second layer from a second polymer matrix including a second fiber reinforcing material embedded within the second polymer matrix;
    forming a third layer from a third polymer matrix including a third fiber reinforcing material embedded within the third polymer matrix, and a filler material interspersed within the third polymer matrix;
    positioning the third layer between the first and second layers; and
    compression molding the first, second and third layers into the multidimensional composite sandwich structure,
    wherein the first and second fiber reinforcing materials each includes a fiber sheet with a plurality of perforations having an average width or diameter of about 10 to 100 microns and an average density of about 100-1000 perforations per square meter of the fiber sheet, and wherein the filler material includes at least 50% by volume of hollow microspheres having an average diameter of about 10 to 100 microns.

15. The method of claim 14, wherein the first and second polymer matrices each includes a thermoset resin matrix, and wherein the fiber sheets of the first and second fiber reinforcing materials are pre-impregnated with the thermoset resin matrix.

16. The method of claim 15, wherein each of the fiber sheets is a perforated unidirectional prepreg with about 40% content by weight of the thermoset resin matrix.

17. The method of claim 14, wherein the hollow microspheres are hollow glass microspheres, and the third polymer matrix includes approximately 0.46 g/cc of the hollow glass microspheres.

18. The method of claim 14, wherein the third polymer matrix includes a liquid epoxy resin that is a reaction product of epichlorohydrin and bisphenol A with a methyltetrahydrophthalic anhydride curing agent.

19. The method of claim 14, wherein the third layer further comprises a frame sheet formed from a fiber sheet pre-impregnated with the thermoset resin matrix, the frame sheet including a through-hole within which is nested the third polymer matrix with the embedded third fiber reinforcing material and the interspersed filler material.

20. A multidimensional composite sandwich structure, comprising:
   first and second skin layers formed from first and second carbon-fiber sheets, respectively, each having a [0/90/90/0] fiber orientation and impregnated with approximately 30% to 50% content by weight of a thermoset epoxy-resin, each of the carbon-fiber sheets including a plurality of perforations having an average width or diameter of about 10 to 100 microns and an average density of about 100-1000 perforations per square meter of the carbon-fiber sheet; and
   a core layer disposed between and molded to the first and second skin layers, the core layer being formed from a third carbon-fiber sheet having the [0/90/90/0] fiber orientation and impregnated with approximately 30% to 50% content by weight of the thermoset epoxy-resin, the core layer including at least about 50% by volume of hollow glass microspheres interspersed throughout the thermoset epoxy-resin and having an average diameter of about 10 to 100 microns.

* * * * *